United States Patent [19]

Law

[11] Patent Number: 4,621,432
[45] Date of Patent: Nov. 11, 1986

[54] TRAILER HOOK-UP GUIDE SYSTEM

[76] Inventor: Thomas Law, P.O. Box 1131, Biloxi, Miss. 39534

[21] Appl. No.: 751,312

[22] Filed: Jun. 27, 1985

[51] Int. Cl.⁴ .............................................. G01C 5/00
[52] U.S. Cl. .................................. 33/264; 116/28 R; 280/477
[58] Field of Search ............. 33/264; 280/477, 478 R; 116/28 R; 340/68 G

[56] References Cited

U.S. PATENT DOCUMENTS

| | | | |
|---|---|---|---|
| 3,015,162 | 1/1962 | Bohnet | 33/46 |
| 3,159,917 | 12/1964 | Whitehead | 116/28 R |
| 3,366,328 | 2/1975 | Alexander et al. | 32/264 |
| 3,418,628 | 12/1968 | Fenner | 280/477 |
| 3,702,029 | 11/1972 | Anderson, Jr. | 33/264 |
| 3,765,703 | 10/1973 | Voelkerding et al. | 280/477 |
| 3,818,599 | 6/1974 | Tague | 33/264 |
| 3,901,536 | 8/1975 | Black | 280/477 |
| 3,918,746 | 11/1975 | Lehtisaari | 33/264 |
| 4,054,302 | 10/1977 | Campbell | 280/477 |
| 4,065,147 | 12/1977 | Ross | 280/477 |
| 4,285,138 | 8/1981 | Berry | 33/264 |
| 4,313,264 | 2/1982 | Miller | 33/264 |

Primary Examiner—Charles Frankfort
Assistant Examiner—Patrick R. Scanlon
Attorney, Agent, or Firm—William F. Hamrock

[57] ABSTRACT

The invention relates to improvements in trailer alignment and hook-up systems which are used with conventional hitching and hitch elements. The system comprises a fork-like sighting member attached to the towing vehicle and a flexible sighting pole assembly attached to the trailer hitch. The vehicles are properly aligned when the hitching element bumps the base or tail of the sighting pole causing it to vibrate while being viewed within the fork-like sighting member.

19 Claims, 10 Drawing Figures

TRAILER HOOK-UP GUIDE SYSTEM

BACKGROUND OF THE INVENTION

1. Field of the Invention

The invention relates to a trailer hook-up guide system particularly adapted for use in assisting the driver of a towing vehicle to align and hook-up a trailer hitching ball, or other device, conventionally carried by the towing vehicle with a trailer hitch socket, or other mating device, conventionally carried on the tongue of the vehicle to be towed. The towing vehicle is backed up so as to place the hitching ball or device beneath the hitch socket of the trailer, and the tongue of the hitch is lowered placing the socket on the hitching ball or device and hooking the vehicles together.

2. Prior Art

Several towing devices have appeared on the market where a unit is attached to the towing behicle and another unit is attached to the hitch or tongue of the towed vehicle. Included in the prior art are several devices for effecting alignment of the hitching ball of the towing vehicle with the hitch socket of the trailer.

U.S. Pat. No. 3,765,703 discloses a complicated coupling system adapted for towing a camper whereby backing up of the towing vehicle causes a guide member on the hitch to engage the tongue and move the tongue in the transverse path until the socket is above the hitch ball. A material element of the system is the dolly wheel attached to the camper which wheel moves in a transverse path to facilitate the transverse shifting of the tongue in the alignment operation. My unique trailer hook-up guide system requires only a simple sighting system which may be attached to the conventional jack stand, if present, or otherwise attached to the trailer tongue and is applicable to all types of trailers.

U.S. Pat. No. 3,818,599 discloses a visual guide means for ball and socket alignment for automotive trailer coupling comprising a sighting device consisting of two similar components which are attached to the hitch arm of the trailer and the ball-carrying hitch arm of the towing vehicle result in sighting elements which are disposed at the same level of the ground and establish a plumb line which passes through the centers of the socket and ball of the coupling between the trailer and the towing vehicle so that when a driver maneuvers the automobile in such a manner that the sighting elements contact each other, the socket and ball are in vertical alignment for coupling purposes. The two sighting elements can simulate respectively the rear and front barrel sighting elements of a gun, pistol or similar firearm. In this manner, the sighting rod element is disposed in front of the V-shaped sighting element during automobile maneuvering operations since it is less likely to obstruct a full view of the latter sighting element than if the two elements were positionally reversed. My unique simple attachments have an improved sighting arrangement by attaching the fork-shaped sighting element to the towing vehicle so that it is in front of the sighting pole element attached to the towed vehicle and functions as an accurate gun-sighting operation eliminating the difficulties involved with the reverse arrangement of the patentee and indicates accurate alignment when the hitching element bumps the tail of the sighting pole.

U.S. Pat. No. 4,313,264 discloses an apparatus for aligning and coupling a pickup truck and a two-wheel trailer which vehicle has the standard arm-ball and arm-cup trailer hitch arrangement. Said apparatus comprises an indicator unit on each vehicle, each unit being formed by a housing containing at least two segments, including a base tubular segment that is hingeably positioned in said housing, and a tip segment; and means for mounting the housing with their longitudinal axes spaced equally from the same side of the longitudinal axis of the vehicles on which they are mounted. Also, U.S. Pat. No. 4,054,302 discloses a trailer hitch guide means for aligning a trailer hitch ball with a trailer hitch socket on the tongue of the trailer. The guide comprises a pair of highly visible and electrically lightable guide members, one of the guide members being adapted to be temporarily attached to the trailer tongue while the other guide member is adapted to be temporarily attached to the rear of the hauling vehicle. I have made an unexpected improvement over both of these systems by inventing a simple fork-like element and pole assembly applicable for aligning and coupling all types of trailers and which signals to the driver accurate alignment of the two vehicles upon contact of the hitching element of the towing vehicle with the tail of the sighting pole attached to the tongue of the towed vehicle.

U.S. Pat. Nos. 3,015,162; 3,866,328, and 4,285,138, disclose other alignment and coupling devices for towing vehicles and trailers. None of these devices suggests my simplified trailer hook-up guide system specifically disclosed herein.

SUMMARY OF THE INVENTION

It is seen from the prior art devices that there remains a demand for an improved trailer alignment and hookup system that is simple, inexpensive, light-weight, is easily assembled to the vehicle and easily disassembled and packaged for storage. There is a demand that such a system be used by the driver alone and without assistance from another person to assist the driver during the aligning and hook-up operation. There is a demand for such an improved system which eliminates the use of clamps, magnets and other elements which would scratch and injure the surface of the towing and towed vehicles.

An object of the present invention is to overcome the disadvantages of the prior art by providing an improved trailer alignment and hook-up guide system that is simple, inexpensive, lightweight, is easily assembled to the vehicle and easily disassembled for storage in a box or pouch.

A further object is to provide a system which is easily visible through the rear window to the driver and can be operated efficiently and accurately by the driver without assistance in a simple operation. A related object is to accurately align the placement of the hitch socket over the hitching ball or device so that the vehicles can be easily hooked-up.

Another object is to provide an improved trailer and alignment hook-up guide system which does not include clamps, magnets and other elements which would scratch or injure the surface of the vehicles.

The above objects of this invention are accomplished by providing an alignment and hook-up guide system which is easily assembled and attached to the vehicles and readily viewable by the driver of the towing vehicle. The inventor's novel guide system is comprised of a fork-like sighting member and a flexible guide pole assembly. The fork-shaped sighting component is in the form of a gun-sight element attached to a suction cup or suction cups which element is secured to the rear of the towing vehicle centered directly over the hitching ball or other hitching device and in vertical alignment therewith. The guide pole assembly is secured to the jack-stand or the hitch tongue connected to the towed vehicle.

In accomplishing the alignment of the vehicles, the operator backs up the towing vehicle and looks out the rear window or rear view mirror through the fork-like sighting member until the guide pole is aligned in the center of the fork-like sighting member. When the driven vehicle has proceeded to a point close to the trailer, the tail portion of the guide pole is bumped by the towing vehicle's hitching ball or device causing the guide pole to vibrate and signal the operator that said hitching ball or device is directly under the trailer hitch socket. The operator then completes the one-person hook-up operation by lowering the hitch socket onto the hitching ball or device by use of the jack stand or other means.

BRIEF DESCRIPTION OF THE DRAWINGS

For a thorough understanding of the nature and objects of the invention, reference should be made to the following detailed description, taken in connection with the accompanying drawings, in which.

DETAILED DESCRIPTION

Figure 1:
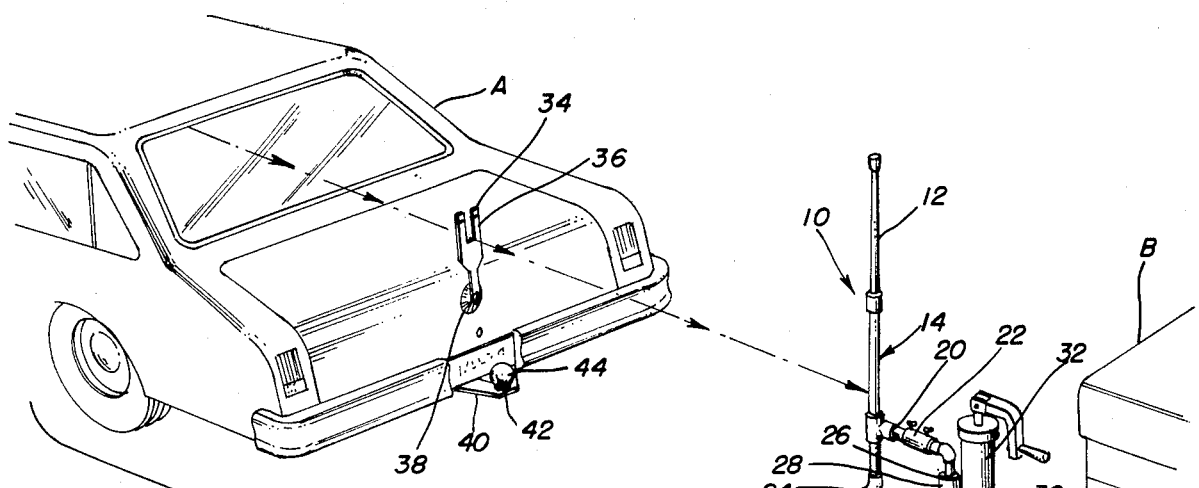
FIG. 1 is a perspective view of an automobile and a trailer preparatory to being aligned in accordance with the invention.
Figure 2:
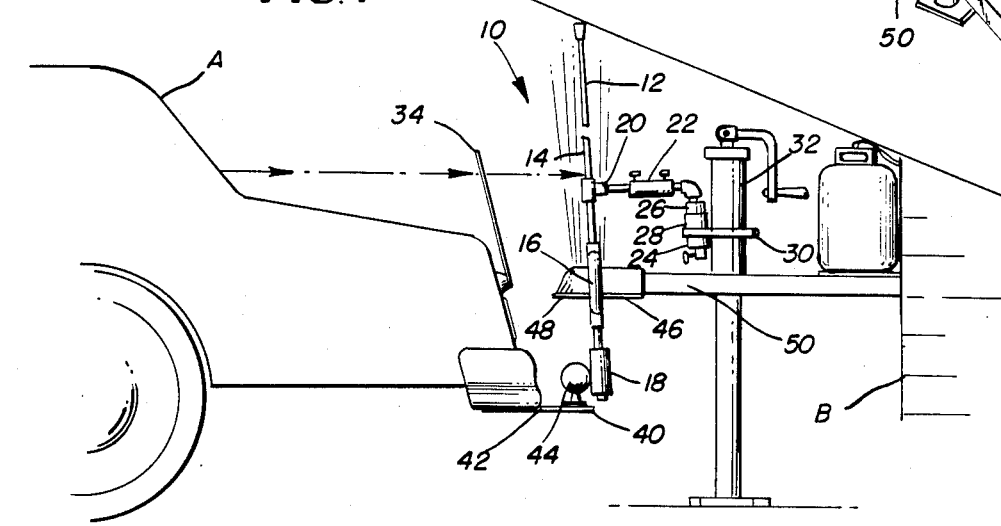
FIG. 2 is a perspective view at the point of alignment indicating the vibrating flexible guide pole element.

Referring to the drawings, FIG. 1 and FIG. 2 illustrate two vehicles which are to be aligned and hooked-up. For illustration, the particular vehicles are an automobile A and a mobile home B. It will be understood that the alignment and hook-up guide of this invention can be used with any towing and towed vehicles including but not limited to automobiles, trucking, vans, all types of trailers, mobile homes, boat-trailers, etc.

A preferred trailer hook-up guide system of the present invention is illustrated in FIGS. 1 and 2. The trailer hitch sighting pole assemby includes four connected sections, 12, 14, 16 and 20 as shown which can be disassembled for storage. The lower portion 16 includes an offset U-shaped member 16 having a tail 18. The U-shaped member 16 hooks around the socket member 48 of the tongue 46 of the conventional trailer hitch system whereby the tail 18 is centered below the socket member 48. A horizontal section member 20 inserted in a tubular sleeve 22, runs adjacent to the offset section member 16 and extends rearward and downward within a tubular sleeve wherein it is inserted into a base clamp 24 comprising tubing 26 inserted in a tubular sleeve 28 and fastened to the jack stand 32 by any suitable means such as a strap or snap fastener 30.

The second member 34 of the inventor's hook-up guide system is the fork-like sighting member 36 secured to the lid of the conventional automobile A by means of a suction cup 38 attached directly above the conventional hitching element 40 and in vertical alignment therewith. The conventional hitching element 40 attached to the rear of the automobile includes an arm 42 and a hitching ball 44 anchored so as to extend upwardly thereof.

The conventional trailer hitch of mobile home B includes a tongue 46 having a socket 48 both of which are forward of the jack stand 32 which is attached to the trailer hitch. The socket 48 is of such dimensions as to be seated on the ball 44 when the vehicles are hooked-up. The jack stand 32 allows the trailer hitch to be raised and lowered to the proper level.

Figure 3:
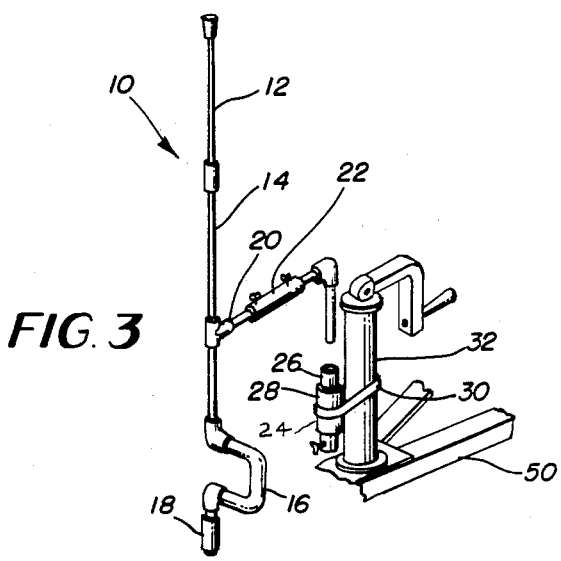
FIG. 3 is a perspective view showing the guide pole assembly may be removed from the clamped portion for disassembly.

FIG. 3 depicts how a preferred trailer hitch sighting pole assembly 10 may be removed from the hose clamp 24 attached to the jack stand 32. The hose clamp 24 may be permanently attached to the jack stand 32 as shown. The sighting pole assembly 10 and the fork-like sighting member 36 may then be disassembled and stored in a box or pouch as depicted in FIG. 6.

Figure 4:
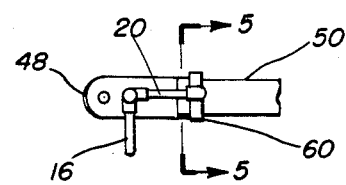
FIG. 4 is a top view of the bracket attached to the trailer tongue having no jack stand.
Figure 5:
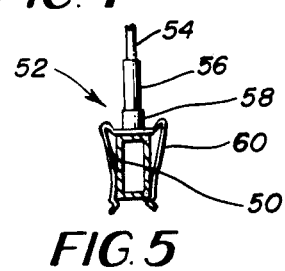
FIG. 5 is a sectional view 5—5 of FIG. 4 showing how the guide pole assembly is clamped to the trailer tongue.
Figure 9:
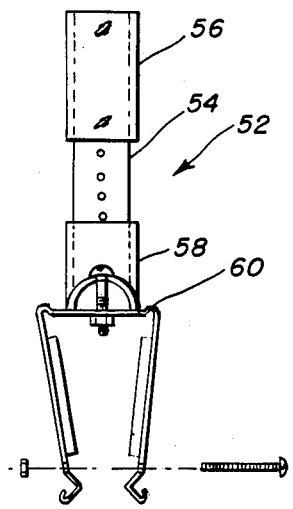
FIG. 9 is a perspective view of the bracket attachment.
Figure 10:
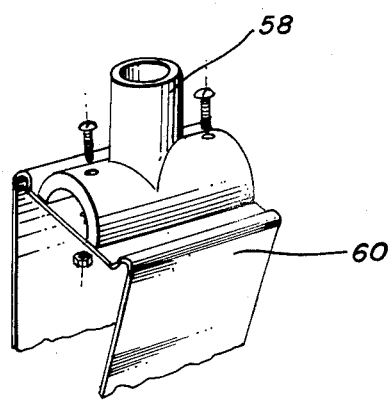
FIG. 10 is a perspective view of the bracket.

FIG. 4, depicts another preferred embodiment where the pole sighting assembly 10 is mounted to the trailer hitch tongue 46 or 50 when no jack stand 32 is present. In this preferred embodiment, a bracket attachment 52 replaces the hose clamp adaptor 24 and jack stand 32. The bracket attachment 52 includes plastic tubing 54 inserted within an aluminum sleeve 56 said plastic tubing is attached to a plastic joint 58 attached to a metal bracket 60. The bracket attachment is clamped onto the trailer tongue 46 or 50 as shown in FIGS. 5, 9 and 10.

Figure 6:
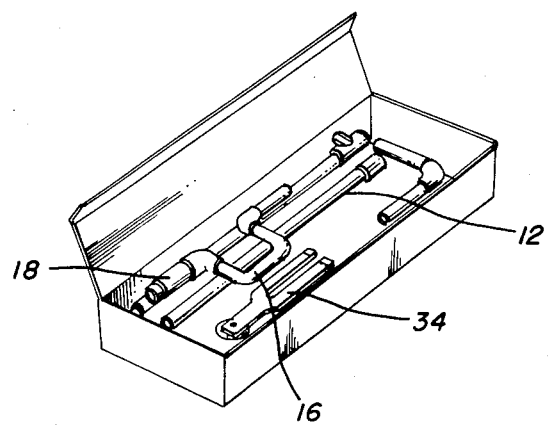
FIG. 6 is a perspective view of the disassembled guide pole assembly in a box or pouch.
Figure 7:
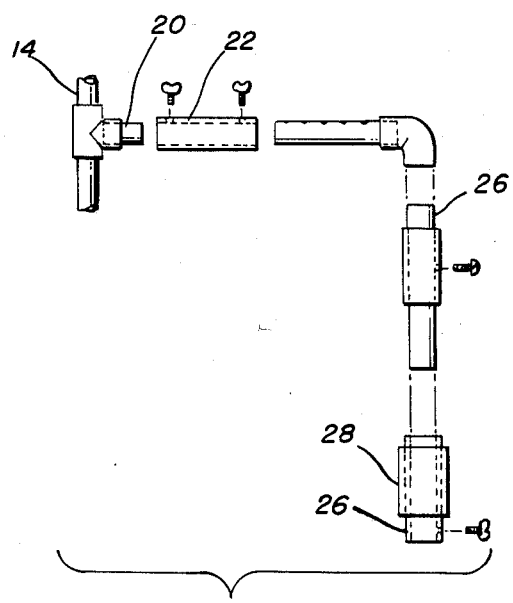
FIG. 7 is a view of the sectional parts of the horizontal member and hose clamp.
Figure 8:
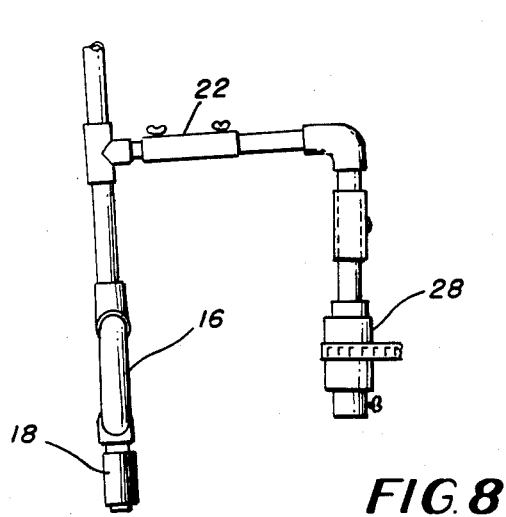
FIG. 8 is a perspective view of the horizontal member and hose clamp.

FIG. 6 is a preferred embodiment depicting the disassembled parts of the inventor's guide system stored in a box or pouch. FIGS. 7 and 8 depict how the horizontal member 20 is attached to the vertical pole and to the hose clamp 24 comprising tube 26 and sleeve 28. The horizontal section member 20 is inserted within the tubular sleeve 22 as is the rearward-downward element thereof also inserted in a tubular sleeve. Said sleeves are used to adjust the length and to lock said member in place.

In the preferred embodiment above the trailer hitch guide pole assembly 10 includes vertical extensible sighting pole sections 12, 14, and 16. However, it can be composed on one or more units as appropriate. One benefit of having sectional units is the easiness of assembly and disassembly and packaging for storage as shown in FIG. 6.

The trailer hitch guide pole assembly 10 can be made of plastic tubing such as CPVC or similar plastic material, or light metal tubing or combinations thereof. The tail section 18 can have a rubber or plastic sleeve or other protection material covering the pole tubing. The horizontal unit of section 20 can be inserted into an aluminum sleeve 22 having thumb screws or the like for adjusting the length of that section and for locking it in place as shown in FIGS. 7 and 8. The rearward-downward unit tubing of section 20 may also be inserted within an aluminum sleeve with adjusting and locking screws also shown in FIGS. 7 and 8. The hose clamp 24 includes an aluminum or other metal, or plastic or hard rubber tubing 26 enclosed within a rubber, plastic or metal sleeve 28 as shown in FIGS. 3, 7 and 8.

The fork-like sighting member 36 can be prepared from metal or plastic and the suction cup 38 or suction cups can be prepared from rubber or plastic. In a preferred embodiment two suction cups are used to secure the fork-like member to the towing vehicle. The upper portions 34 of the fork 36, and the sighting portions of the vertical pole 12 and 14 may be coated or covered with a reflective coating or material to increase visibility.

As discussed above in the preferred embodiment where there is no jack stand 32 attached to the trailer hitch 46, a bracket attachment 52 is clamped onto the trailer tongue 46 or 50. The bracket attachment 52 can be clamped onto the trailer tongue 46 or 50, as shown, or can be clamped to another convenient location. The trailer hitch guide pole assembly 10 is inserted into the tubing sleeve section 56 in the same manner as it is inserted into close clamp adapter 24. Tubing section 54 is within the aluminum or metal or plastic tubing sleeve 56 which also has thumb screws or the like for adjusting the length of that section and for locking it in place as shown in FIG. 9. The plastic joint 58 can be prepared from CPVC tee joint with its bottom half cut off or other material and said joint bolted to the steel or metal bracket 60 as shown in FIGS. 5, 9 and 10.

In accomplishing the alignment and hook-up operation with the inventor's preferred system as described above, the operator backs up the towing vehicle A and looks through the fork-like sighting member 36 until the guide pole section 12 or 14 is aligned in the center of the fork 36. When the towing vehicle A has backed up into close proximity to the trailer B, the hitching ball 44 of vehicle A's hitching element 40 intersects and bumps the tail 18 of the guide pole assembly 10 causing the guide pole sections 12 and 14 to vibrate and to signal the operator that, the hitching ball 44 is directly under the hitch socket 48. The operator then completes the coupling operation by lowering the hitch tongue 46 with the jack stand 36 or otherwise, whereby the hitch socket 48 is lowered onto the hitching ball 44 to complete the hook-up operation.

The unexpected improvement in the invention is the efficiency and accuracy of the system in signalling the operator when the hitching ball or device and hitch socket or element are properly aligned. That signal is the vibrating pole seen through the fork-like sighting member by the operator. The vibration of the pole element is caused by the pole tail 18, that is the bottom end of said pole element, being bumped by the hitching ball or device. The vibrating pole is instantly and clearly visible to the operator and at that point the hitching ball or device and the hitch socket or element are in proper alignment for the hook-up or coupling operation. For operating in dim light or in darkness, a flashlight or other lighting means may be used. For increased visibility, the fork-like sighting member 34 and/or the vertical sighting pole elements 12 and 14 may be coated or covered with a reflective material. For further improvement in visibility, an optical lens may be affixed to or molded within the fork-like member for a clearer viewing of the alignment operation.

The unique construction of the sighting pole assembly and its attachment to the components attached to the jackstand or tongue of the hitch of the towed vehicle result in the unexpected improved efficiency and accuracy in the alignment operation. The joint connections of the vertical pole with the horizontal section member 20 and that rearward-downward section joint connection with the hose clamp adaptor 24 or with the bracket 52 allow the vertical pole sections to vibrate without damage thereto and permit the entire sighting pole assembly to return to its normal position when the stress is removed without damage thereto. In a preferred embodiment, these connections include CPVC tees and elbows and aluminum sleeves covering the CPVC tubing. However, any material can be used which has the resiliency, flexibility, toughness and durability for the operation such as plastic, hard rubber or metal.

While the invention has been described in terms of the preferred embodiments, the following claims are intended to encompass all embodiments which fall within the scope of the invention.

What is claimed is:

1. Guide system for aligning and hooking-up a towing vehicle having a hitching element to a towed vehicle having a hitch element comprising
    a fork-like sighting member attached to the rear of the towing vehicle above said hitching element and in vertical alignment therewith and
    a flexible sighting pole assembly adjustably attached to the towed vehicle, said assembly including
    a vertical sighting pole having a lower end and a longitudinal axis,
    an offset U-shaped member attached to the lower end of said vertical sighting pole,
    a tail section extending from said U-shaped member along said longitudinal axis on a side of the U-shaped member opposite the vertical sighting pole,
    said U-shaped member being positioned to extend around said hitch element, with the tail section below the hitch element so that said longitudinal axis extends substantially vertically through the hitch element, whereby when aligning said hitching element and said hitch element for hook-up, said hitching element bumps said tail section causing the vertical sighting pole to vibrate and thereby provide an indication of proper alignment when viewed through said fork-like sighting member.

2. A guide system according to claim 1 whereby the fork-like sighting member is attached to the towing vehicle by means of at least one suction cup.

3. A fork-like sighting member according to claim 2 whereby said at least one suction cup is made of tubber.

4. A fork-like sighting member according to claim 3 whereby the fork-like sighting component is prepared from metal.

5. A guide system according to claim 4 whereby the sighting pole assembly is attached to a jack stand of said hitch element.

6. A guide system according to claim 4 wherein said hitch element has a hitch tongue whereby said sighting pole assembly is attached to the hitch tongue of said hitch element.

7. A guide system according to claim 1 whereby said assembly includes a horizontal member attached perpendicularly to the vertical sighting pole at a point adjacent to said offset U-shaped member.

8. A guide system according to claim 7 whereby said horizontal member is attached to a jack stand of said hitch element.

9. A guide system according to claim 7 wherein said hitch element has a hitch tongue whereby said horizontal member is attached to the hitch tongue of said hitch element.

10. A guide system according to claim 8 whereby said horizontal member is connected to a hose clamp attached to said jack stand.

11. A guide system according to claim 9 whereby said horizontal member is connected to a bracket attached to said hitch tongue.

12. A guide system according to claim 1 whereby said tail section is plastic tubing enclosed in a rubber sleeve.

13. A guide system according to claim 8 where said hitching element includes a ball and said hitch element includes a socket.

14. A guide system according to claim 10 where said hitching element includes a ball and said hitch element includes a socket.

15. A guide system according to claim 7 wherein said horizontal member is adjustable in length.

16. A guide system according to claim 10 wherein said horizontal member and said hose clamp are connected by means which permit vertical adjustment of said horizontal member.

17. A guide system according to claim 11 wherein said horizontal member and said bracket are connected by means which permit vertical adjustment of said horizontal member.

18. A guide system according to claim 7 whereby said sighting pole assembly is made in sections which can be disassembled so that said sections can be stored in a container; said fork-like sighting member being removable from said towing vehicle to also be stored in said container.

19. A guide system according to claim 18 wherein said sections are made of interfitting pieces of metal and/or plastic tubing.

* * * * *